(12) United States Patent
Dureau et al.

(10) Patent No.: US 12,308,133 B2
(45) Date of Patent: May 20, 2025

(54) METHOD FOR PRODUCING LEAD-212 FROM AN AQUEOUS SOLUTION COMPRISING THORIUM-228 AND DAUGHTERS THEREOF

(71) Applicant: ORANO MED, Châtillon (FR)

(72) Inventors: Rémy Dureau, Saint-Gence (FR); Julien Torgue, Gaithersburg, MD (US)

(73) Assignee: ORANO MED, Châtillon (FR)

( * ) Notice: Subject to any disclaimer, the term of this patent is extended or adjusted under 35 U.S.C. 154(b) by 1078 days.

(21) Appl. No.: 17/278,479

(22) PCT Filed: Sep. 17, 2019

(86) PCT No.: PCT/FR2019/052165
§ 371 (c)(1),
(2) Date: Mar. 22, 2021

(87) PCT Pub. No.: WO2020/065180
PCT Pub. Date: Apr. 2, 2020

(65) Prior Publication Data
US 2022/0037046 A1    Feb. 3, 2022

(30) Foreign Application Priority Data
Sep. 26, 2018 (FR) ...................... 1858833

(51) Int. Cl.
| | | |
|---|---|---|
| B01D 15/16 | (2006.01) |
| B01D 15/18 | (2006.01) |
| B01D 15/20 | (2006.01) |
| B01D 15/26 | (2006.01) |
| G21G 1/00 | (2006.01) |

(52) U.S. Cl.
CPC ........... G21G 1/001 (2013.01); B01D 15/166 (2013.01); B01D 15/1871 (2013.01); B01D 15/20 (2013.01); B01D 15/265 (2013.01); G21G 2001/0094 (2013.01)

(58) Field of Classification Search
CPC ........... G21G 1/001; G21G 2001/0094; B01D 15/166; B01D 15/1871; B01D 15/20; B01D 15/254
See application file for complete search history.

(56) References Cited

U.S. PATENT DOCUMENTS 4,663,129 A * 5/1987 Atcher ..................... G21G 4/08
423/2
2015/0170776 A1    6/2015 Torgue et al.
2018/0308600 A1    10/2018 Torgue et al.

FOREIGN PATENT DOCUMENTS

WO    2013174949 A1    11/2013
WO    2017093069 A1    6/2017

OTHER PUBLICATIONS

TRISKEM, "Pb resin Product Sheet", TRISKEM International. Oct. 12, 2015.*

(Continued)

*Primary Examiner* — Benjamin L Lebron
(74) *Attorney, Agent, or Firm* — Chrisman Gallo Tochtrop LLC

(57) ABSTRACT

A method for producing lead-212 of very high radiological purity from an aqueous solution comprising thorium-228 and daughters thereof. Manufacture of radiopharmaceuticals based on lead-212, which are useful in nuclear medicine and, in particular, in targeted alpha radiation therapy for the treatment of cancers.

19 Claims, 2 Drawing Sheets

(56) References Cited

OTHER PUBLICATIONS

Search Report for French application No. FR1858833 dated Jun. 17, 2019.
International Search Report for PCT/FR2019/052165 dated Jan. 23, 2020.
Written Opinion for PCT/FR2019/052165 dated Jan. 23, 2020.

* cited by examiner

METHOD FOR PRODUCING LEAD-212 FROM AN AQUEOUS SOLUTION COMPRISING THORIUM-228 AND DAUGHTERS THEREOF

CROSS-REFERENCE TO RELATED APPLICATIONS

This is a National Stage application of PCT international application PCT/FR2019/052165, filed on Sep. 17, 2019, which claims the priority of French Patent Application No. 1858833, filed Sep. 26, 2018, both of which are incorporated herein by reference in their entirety.

TECHNICAL FIELD

The invention relates to the field of the production of radioactive isotopes, also known as radioisotopes.

More specifically, it relates to a method which makes it possible to produce lead-212 of very high radiological purity from an aqueous solution comprising thorium-228 and daughters thereof, also known as progeny products.

This method is therefore likely to find applications in the manufacture of radiopharmaceuticals based on lead-212, suitable for use in nuclear medicine and, in particular, in targeted alpha radiotherapy for cancer treatment.

PRIOR ART

Lead-212 is a rare radioactive isotope of lead, which has been the subject of several years of promising research, particularly for the treatment by targeted alpha radiotherapy, also known as targeted alpha therapy, of cancers and, in particular, pancreatic, ovarian, colon, breast and prostate cancers.

Lead-212 is also among the radioisotopes which have been demonstrated to be of interest for medical imaging, particularly for carrying out investigations by single-photon emission computed tomography combined with computed tomography.

In both cases, the use of lead-212 implies that it is either injected into the patient in the form of a radiopharmaceutical, i.e. a product wherein it is bound, typically by means of a chelating agent, to a molecule capable of very specifically targeting the cells to be destroyed (in the case of targeted alpha therapy) or observed (in the case of medical imaging), such as an antibody.

For this, lead-212 must meet extremely strict quality requirements, and, in particular, in respect of radiological purity, which ideally should be at least equal to 99.95%.

In this regard, the term radiological purity of a radioisotope such as lead-212 denotes the purity that this radioisotope has with respect to the radioisotopes from which it is obtained by radioactive disintegration as well as with respect to the other radioisotopes which are not part of its radioactive disintegration chain, and not the purity that this radioisotope has with respect to the radioisotopes that it generates by its own radioactive disintegration, i.e. its daughters.

As illustrated by FIG. 1 appended, which represents the radioactive disintegration, or decay, chain of thorium-232, lead-212 belongs to the radioactive family of thorium-232 of which it is a daughter product. It is also a daughter product of thorium-228 and radium-224 which are incorporated, in this chain, between thorium-232 and lead-212.

To produce medical-grade lead-212, i.e. meeting the abovementioned radiological purity requirements, International PCT applications WO 2013/174949 and WO 2017/093069, hereinafter references [1] and [2], have proposed methods which comprise:
producing lead-212 by radioactive disintegration of radium-224 in a generator comprising a solid medium whereon radium-224 is retained;
extracting the lead-212 from the generator in the form of a strongly acidic aqueous solution; and
purifying the lead-212 by liquid chromatography.

This chromatography is carried out by loading with a strongly acidic aqueous solution a chromatography column comprising a stationary phase which, at strong acidity, retains lead but does not retain the radiological impurities liable to be present in this aqueous solution, then washing the stationary phase with an aqueous solution, also strongly acidic, to remove said radiological impurities from the column and by then eluting the lead-212 by means of an aqueous solution, of pH between 5 and 9, which makes it possible to retrieve it in a purified form.

The production of lead-212 by the methods described in references [1] and [2] requires that radium-224 be produced previously.

A generator is typically a liquid chromatography column which comprises a solid stationary phase whereon a parent radioisotope is selectively retained and which is washed regularly with a liquid phase making it possible to elute the daughter radioisotope(s) which form(s) in this column by radioactive disintegration of the parent radioisotope.

In view of the affinity that the stationary phase of a generator must have with respect to a particular metallic element, it is understood that the stationary phases which are respectively used in radium-224 and lead-212 generators consist of stationary phase material which not only are different from one another but are also different from the stationary phase material which is used, in references [1] and [2], for purifying lead-212.

However, to simplify the production of lead-212 and, by the same token, reduce the costs thereof, it would be desirable to be able to reduce both the number of different generators and the number of stationary phase materials which are currently used for this production.

Moreover, each generator can, in theory, be used as long as the quantity of parent radioisotope which is fixed on the stationary phase of this generator is sufficient to ensure a daughter radioisotope production with a satisfactory yield.

However, in practice, it is found that keeping a parent radioisotope on a stationary phase for a long time induces a progressive degradation of this stationary phase by radiolysis, which gradually affects the ability thereof to retain the parent radioisotope, resulting in the appearance of leaks of this radioisotope, the obligation to perform a regular maintenance of the generator to prevent the appearance of these leaks and, despite this maintenance, a premature scrapping of the generator. However, here also, this premature scrapping contributes to an increase in the production costs of lead-212.

In view of the above, the Inventors set themselves the aim of providing a method making it possible to produce lead-212 having a radiological purity comparable to that of lead-212 obtained in references [1] and [2] but at notably lower costs, notably by reducing the maintenance of this production.

DESCRIPTION OF THE INVENTION

The aim of the invention is precisely that of proposing a method for producing lead-212 from an acidic aqueous solution A1 comprising thorium-228 and daughters thereof, which meets these requirements.

This method comprises:
a purification of the lead-212 present in the aqueous solution A1, which purification comprises the following steps:
a) providing a first chromatography column comprising a first stationary phase which selectively retains lead with respect to thorium and radium when thorium-228 and the daughters thereof are in an acidic aqueous solution having a pH between a first pH value, $pH_1$, and a second pH value, $pH_2$, greater than $pH_1$;
b) loading the first chromatography column with the aqueous solution A1, the aqueous solution A1 having a pH between $pH_1$ and $pH_2$;
c) at least one washing of the first stationary phase with an acidic aqueous solution A2 having a pH between $pH_1$ and $pH_2$;
d) eluting the lead-212 from the first stationary phase with an aqueous solution A3 having a pH greater than $pH_2$, whereby an aqueous solution A4 comprising lead-212 is obtained; then
a purification of the lead-212 present in the aqueous solution A4, which purification comprises the following steps:
e) loading a second chromatography column with the aqueous solution A4, the second chromatography column comprising a second stationary phase which selectively retains lead with respect to thorium and radium when thorium-228 and the daughters thereof are in an acidic aqueous solution having a pH between a first pH value, $pH_3$, and a second pH value, $pH_4$, greater than $pH_3$;
f) at least one washing of the second stationary phase with an aqueous solution A5 having a pH between $pH_3$ and $pH_4$; and
g) eluting the lead-212 from the second stationary phase with an aqueous solution A6 having a pH greater than $pH_4$.

An aqueous solution which comprises lead-212 of very high radiological purity is thus obtained, only using two stationary phases and without using either a radium-224 generator or a lead-212 generator.

Hereinabove and hereinafter, the term "daughters" of thorium-228 denotes all the radioisotopes which are incorporated downstream from thorium-228 in the disintegration chain of thorium-232 illustrated in FIG. 1 (i.e. radium-224, radon-220, polonium-216, lead-212, bismuth-212, thallium-208 and polonium-212) as well as lead-208, a stable isotope of lead, which ends this chain.

Moreover, the expressions "from . . . to . . . ", "ranging from . . . to . . . " and "between . . . and . . . " are equivalent and denote that the bounds are included.

According to the invention, the first and second stationary phases can be made of identical or different materials, which can be selected from all the materials which are capable of retaining lead but do not retain thorium and radium when these materials are contacted with an acidic aqueous solution having a certain acidity (defined here as being included between $pH_1$ and $pH_2$ for the first stationary phase and between $pH_3$ and $pH_4$ for the second stationary phase) and wherein thorium-228 and the daughters thereof are found. When the first and second stationary phases consist of the same material, then $pH_1$ is equal to $pH_3$ whereas $pH_2$ is equal to $pH_4$.

Such materials can comprise an inert, inorganic (such as silica or alumina particles or a silica gel), organic (such as a polymer) or inorganic-organic solid support, which is functionalised, by grafting or impregnation, with organic molecules which retain lead ions ($Pb^{2+}$) by ion exchange, extraction, molecular recognition or any other mechanism but which do not retain thorium and radium ions.

Moreover, the acid present in the aqueous solutions A1, A2 and A5 can be any acid, strong or weak, this acid being preferably the same in the aqueous solutions A1, A2 and A5.

As stated above, step c) comprises at least one washing of the first stationary phase with an acidic aqueous solution A2.

This washing is essentially intended to remove from the first chromatography column and, particularly, from the interstitial volume of the first stationary phase, thorium-228 and the daughters thereof other than lead and, in particular, radium-224, capable of being retained in the first chromatography column in step b). For this reason, it can be carried out with an aqueous solution A2 which has the same pH as that of the aqueous solution A1.

However, advantageously, this washing can also be used to prepare the first stationary phase for being contacted with the aqueous solution A3 which, as stated above, has a pH greater than the upper limit, referred to as $pH_2$, of the pH range—and, therefore, an acidity less than the lower limit of the acidity range—for which lead is retained by the material of the first stationary phase when it is present in an acidic aqueous solution.

In this case, the aqueous solution A2 is a solution which, while having a pH between $pH_1$ and $pH_2$, has a pH greater than that of the aqueous solution A1.

Preferably, step c) comprises two successive washings of the first stationary phase each having the function of removing from the first chromatography column thorium-228 and the daughters thereof other than lead capable of being retained in the first chromatography column but also of preparing the first stationary phase for being contacted with the aqueous solution A3.

In this case, step c) comprises a first washing of the first stationary phase (20) with the aqueous phase A2 having a pH between $pH_1$ and $pH_2$ but greater than the pH of the aqueous phase A1 and a second stationary phase (20) with an aqueous solution A2' having a pH between $pH_1$ and $pH_2$ but greater than the pH of the aqueous solution A2.

According to the invention, the aqueous solution A3, which is used in step d), is advantageously an aqueous solution comprising an agent complexing lead.

This complexing agent can be selected particularly from citrate, oxalate or acetate ions. It can also consist of glycine or an aminopolycarboxylic acid, such as ethylenediaminetetraacetic acid (or EDTA), or a salt thereof such as a sodium salt. It is preferred that this solution is an aqueous solution of a citrate, an oxalate or an acetate of ammonium or sodium whose the pH is between 5 and 9 and, even better, between 5 and 7.

Considering that, like any chromatography column, the first chromatography column has a first and a second end opposite one another, the aqueous solutions A1 and A2 are circulated in this column from the first end thereof to the second end thereof whereas the aqueous solution A3 is preferably circulated in the opposite direction, i.e. from the second end of the column to the first end thereof.

In the case where the aqueous solution A4 has a pH greater than $pH_4$, then the method advantageously further comprises, between steps d) and e), an acidification of the aqueous solution A4 to bring the pH thereof to a value between $pH_3$ and $pH_4$. Obviously, when the material of the second stationary phase is identical to that of the first stationary phase and when the aqueous solution A4 has a pH greater than $pH_2$, the acidification of the aqueous solution A4 aims to bring the pH thereof to a value between $pH_1$ and $pH_2$.

This acidification can be carried by simply adding acid to the aqueous solution A4.

However, within the scope of the invention, it is preferred to acidify the aqueous solution A4 by subjecting the first stationary phase to at least one washing with an acidic aqueous solution A7 and by adding all or part of the aqueous solution from this washing to the aqueous solution A4.

The volume of aqueous solution A7 and the acid concentration thereof are therefore advantageously selected so that adding all or part of the aqueous solution A7 to the aqueous solution A4 makes it possible, on its own, to bring the pH of the aqueous solution A4 to a value between $pH_3$ and $pH_4$ or between $pH_1$ and $pH_2$ when the material of the second stationary phase is identical to that of the first stationary phase and, even better, to a pH value equal or substantially equal to the pH value of the aqueous solution A1.

The aqueous solution A7 is preferably circulated in the first chromatography column from the second end of this column to the first end thereof.

As stated above, step f) comprises at least one washing of the second stationary phase with an acidic aqueous solution A5.

Here also, it is preferred that this washing, beyond removing from the second chromatography column and, particularly, from the interstitial volume of the second stationary phase, the traces of thorium-228 and of the daughters thereof other than lead capable of having been retained in the second chromatography column in step e) above, makes it possible to prepare the second stationary phase for being contacted with the aqueous solution A6 which, like the aqueous solution A3, has a pH greater than the upper limit of the range of pHs—and, therefore, an acidity less than the lower limit of the acidity range—for which lead is retained by the material of the second stationary phase when it is present in an acidic aqueous solution.

For this reason, although the washing of step f) can be carried out with an aqueous solution A5 which has the same pH as that of the aqueous solution A4, it is preferred that it is carried out with an aqueous solution A5 which, while having a pH between $pH_3$ and $pH_4$, has a pH greater than that of the aqueous solution A4.

Like step c), step f) comprises preferably two successive washings of the second stationary phase, namely a first washing which is carried out with the aqueous solution A5 having a pH between $pH_3$ and $pH_4$ but of pH greater than the pH of the aqueous phase A4 and a second washing which is carried out with an acidic aqueous solution A5' which, while having a pH between $pH_3$ and $pH_4$, has a pH greater than that of the aqueous solution A5.

The aqueous solution A6, which is used in step g), is advantageously an aqueous solution comprising an agent complexing lead.

As above, this complexing agent can be selected from citrate, oxalate or acetate ions, glycine or aminopolycarboxylic acids (such as EDTA) and the salts of these acids.

Here also, it is preferred that this solution is an aqueous solution of a citrate, an oxalate or an acetate of ammonium or sodium wherein the pH is between 5 and 9, particular preference being given to a pH between 5 and 7.

Moreover, the aqueous solution A6 is preferably circulated in the second chromatography column in the opposite direction of that wherein the aqueous solutions A4 acidified and A5 are circulated.

In a preferred implementation of the invention, the first and second stationary phases are made of a stationary phase material which retains lead by extraction and, more specifically, made of a material which comprises a solid support impregnated with a solution comprising a crown-ether as an extractant and, in particular, a dicyclohexano-18-crown-6 or a dibenzo-18-crown-6 wherein the cyclohexyl or benzyl groups are substituted by one or more straight-chain or branched $C_1$ to $C_{12}$ alkyl groups, in an organic diluent non-miscible with water, typically a long-chain hydrocarbon alcohol, i.e. $C_8$ or more.

More preferably, a stationary phase material is used which comprises 4,4'(5')-di-tert-butylcyclohexano-18-crown-6 as an extractant, preferably in solution in isodecanol.

This type of stationary phase material is particularly available in the form of particles packaged in bottles but also in the form of ready-to-use chromatography columns, or cartridges, from the companies Triskem International and Eichrom Technologies, Inc. under the trademark Pb Resin.

Such a stationary phase material retains lead when it is in an acidic medium, for example nitric or hydrochloric, at pH values typically less than or equal to 2.

However, within the scope of the invention, it is preferred that the aqueous solution A1, which is used in step b), is a solution which comprises nitric acid, advantageously at a rate of 1 mol/L to 2 mol/L of nitric acid and, even better, at a rate of 2 mol/L of nitric acid.

It is also preferred that the other acidic aqueous solutions used in the method comprise, also, nitric acid.

In this case:
if step c) only comprises a single washing, then the aqueous solution A2 has preferably a nitric acid concentration which is at least equal to 0.01 mol/L but less than 1 mol/L; whereas
if step c) comprises two washings, then:
  *the aqueous solution A2 has preferably a nitric acid concentration which is at least equal to 0.5 mol/L but less than 1 mol/L, a concentration of 0.5 mol/L being particularly preferred, and
  *the aqueous solution A2' has preferably a nitric acid concentration at least equal to 0.01 mol/L but less than 0.5 mol/L, a concentration of 0.1 mol/L being particularly preferred.

Preferably, the aqueous phase A4, which is used in step f), comprises, like the aqueous phase A1, from 1 mol/L to 2 mol/L and, even better, 2 mol/L of nitric acid.

Moreover:
if step f) only comprises a single washing, then the aqueous solution A5 has preferably a nitric acid concentration which is at least equal to 0.01 mol/L but less than 1 mol/L; whereas
if step f) comprises two washings, then:
  *the aqueous solution A5 has preferably a nitric acid concentration which is at least equal to 0.5 mol/L but less than 1 mol/L, a concentration of 0.5 mol/L being particularly preferred, and
  *the aqueous solution A5' has preferably a nitric acid concentration at least equal to 0.01 mol/L but less than 0.5 mol/L, a concentration of 0.1 mol/L being particularly preferred.

As regards the aqueous solutions A3 and A6, they consist preferably of aqueous solutions of a citrate, an oxalate or an acetate of ammonium or sodium whose the pH is at least equal to 5 so as to allow the citrate, oxalate or acetate ions exerting their complexing power with respect to lead-212 and, thus, facilitating the elution thereof from the first and the second stationary phase respectively, and at most equal to 9, particular preference being given to a pH between 5 and 7.

Advantageously, thorium-228 and the daughters thereof are at radioactive equilibrium in the aqueous solution A1.

In the case where it is sought to optimise the specific activity of lead-212 to be produced, it is possible to provide, prior to step a), a step aimed at removing lead-208, which ends the disintegration chain of thorium-232 and is liable to be accumulated in the aqueous solution A1 as a stable isotope of lead.

In this case, this step comprises a circulation of the aqueous solution A1 in a chromatography column comprising a stationary phase which selectively retains lead when thorium-228 and the daughters thereof are in an acidic aqueous solution, and a collection of the aqueous solution A1 having circulated in the chromatography column.

It is then simply necessary to allow lead-212 to reform by decay of the radium-224 present in the aqueous solution A1 to be able to proceed to step a), which involves waiting about 48 hours before proceeding to step a).

According to the invention, the stationary phase used to remove lead-208 from the aqueous phase A1 can consist of the same material as the first and second stationary phases or of a different material. However, with the aim of reducing the number of different stationary phase materials used, it is preferred that the constituent material of the stationary phase used to remove lead-208 from the aqueous phase A1 is the same material as that forming the first and second stationary phases.

In addition to the advantages already mentioned, the method comprises the advantage of being capable of being implemented without using hydrochloric acid, which is the acid present in the acidic aqueous solutions used in the examples of references [1] and [2]. It is, indeed, advantageous to avoid the use of hydrochloric acid as it is a highly corrosive acid which damages in the long term the equipment wherein the production of lead-212 is implemented.

Further features and advantages of the method according to the invention will emerge on reading the following supplementary description and which relates to a preferred implementation of this method.

Obviously, this preferred implementation is merely given by way of illustration of the subject matter of the invention, and in no way represents a restriction of this subject matter.

DETAILED DESCRIPTION OF A SPECIFIC IMPLEMENTATION

Figure 1:
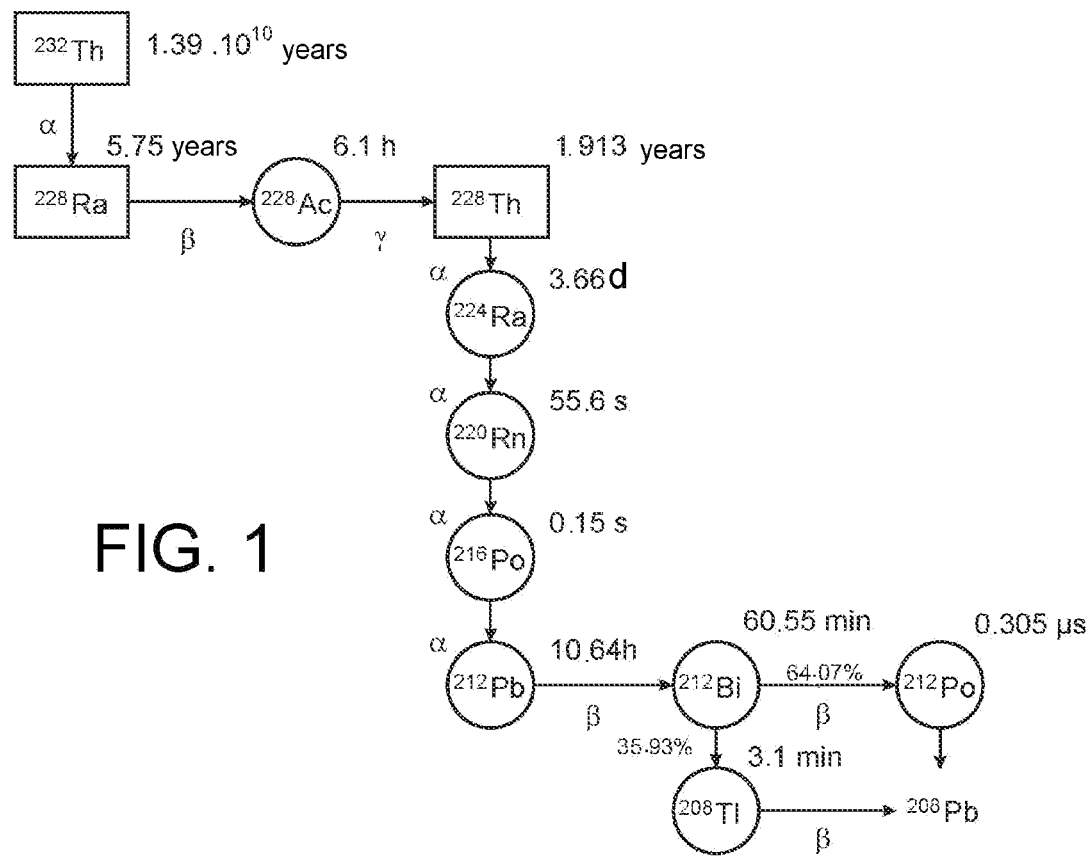
FIG. 1, previously described, represents the radioactive disintegration chain of thorium-232.
Figure 2:
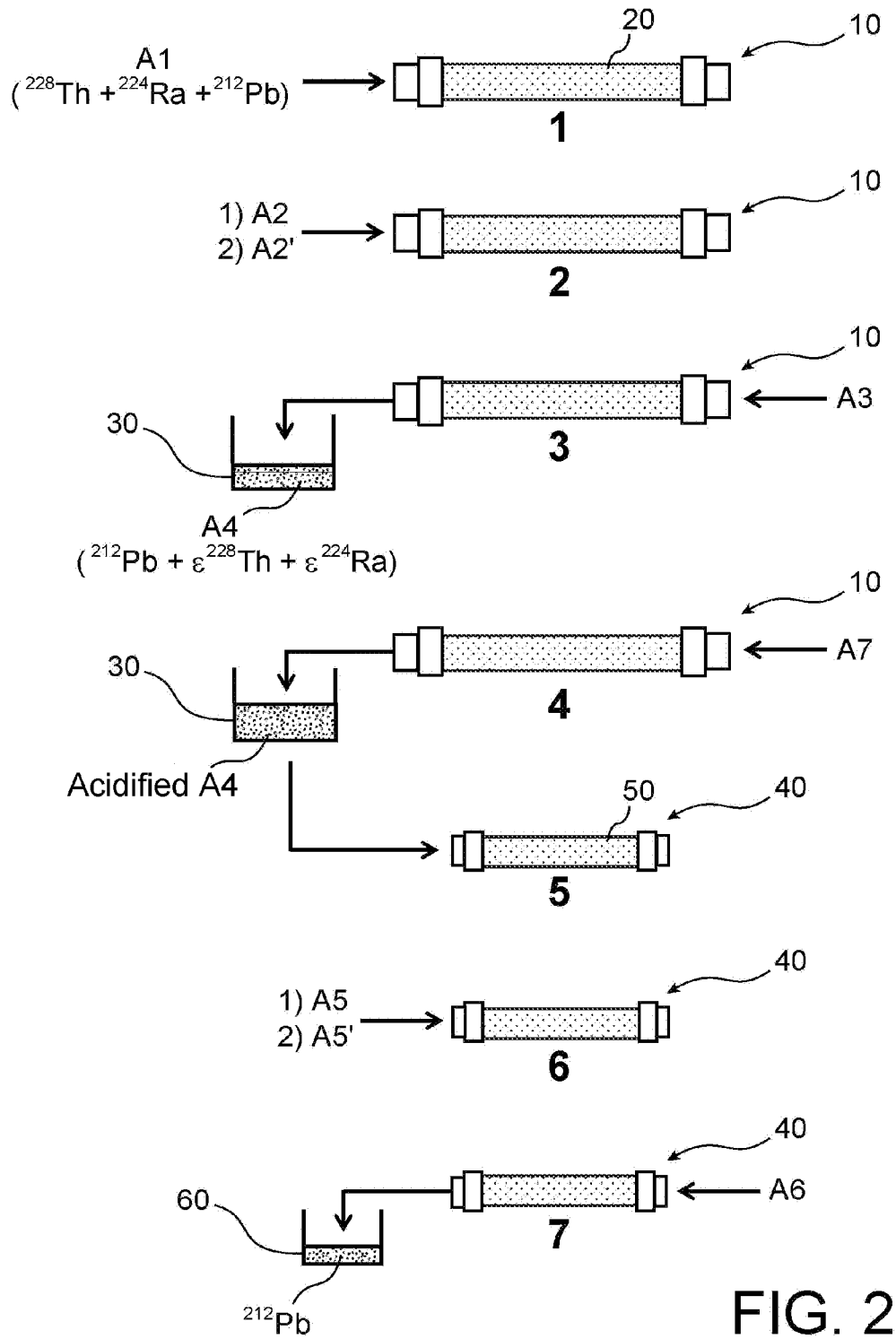
FIG. 2 schematically represents the different steps of a preferred implementation of the method according to the invention.

Reference is made to FIG. 2 which schematically represents the different steps, referenced 1 to 7, of a preferred implementation of the method according to the invention.

In this implementation, the method comprises the following steps:

1. loading a first chromatography column, referenced 10, whose the stationary phase, referenced 20, consists of Pb Resin™ particles with an aqueous nitric acid solution A1, which comprises thorium-228 and the daughters thereof, preferably at radioactive equilibrium, to fix the lead-212 contained in this solution on the stationary phase 20;
2. two successive washings of the stationary phase 20 with two aqueous nitric acid solutions A2 and A2', of decreasing concentration, to remove from the column 10 the radioisotopes other than lead-212 capable of having been retained in the column 10 in the preceding step while preparing the stationary phase 20 for being contacted, in the following step, with an aqueous solution of higher pH;
3. eluting the lead-212 from the stationary phase 20 by means of an aqueous ammonium acetate solution A3 and collecting in a receptacle, referenced 30, such as a beaker, flask or similar, the eluate, or aqueous solution A4, comprising lead-212;
4. washing the stationary phase 20 with an aqueous nitric acid solution A7 and collecting the solution issued from this washing in the receptacle 30 to acidify the eluate present in this receptacle;
5. loading a second chromatography column, referenced 40, whose the stationary phase, referenced 50, consists of Pb Resin™ particles, with the eluate/washing solution mixture, or acidified aqueous solution A4, present in the receptacle 30 to fix the lead-212 contained in this mixture on the stationary phase 50;
6. two successive washings of the stationary phase 50 with two aqueous nitric acid solutions A5 and A5', of decreasing concentration, to remove from the column 40 the traces of radioisotopes other than lead-212 capable of having been retained in the column 40 in the preceding step while preparing the stationary phase 50 for being contacted, in the following step, with an aqueous solution of higher pH; and
7. eluting the lead-212 from the stationary phase 50 by means of an aqueous ammonium acetate solution A6 and collecting in a receptacle, referenced 60, the eluate comprising the lead-212.

All these steps, which are detailed hereinafter, are performed at ambient temperature, i.e. at a temperature of 20° C. to 25° C.

Moreover, all the solutions used are preferably of Optima™ grade or prepared using Optima™ grade or "Trace Metals grade" reagents.

*Step 1:

The chromatography column 10 is a column which has, for example, a bed volume (or BV) ranging from 0.104 mL to 1.25 mL and which is filled with Pb Resin™ particles (between 50 μm and 100 μm in size), for example at a rate of 42 mg to 500 mg of particles according to the BV of the column.

At an acidity between 0.01 mol/L and 10 mol/L of nitric acid, Pb Resin™ retains lead, regardless of the isotopes thereof ($^{212}Pb$ and $^{208}Pb$), but does not retain thorium-228 or the daughters thereof other than lead and, particularly, radium, regardless of the isotopes thereof.

Its affinity for lead is, however, optimal for nitric acid concentrations between 1 mol/L and 2 mol/L.

The loading of the column 10 is carried out by circulating in this column several BVs of aqueous solution A1, which comprises:

thorium-228 and the daughters thereof, preferably at radioactive equilibrium, and notably radium-224 which is issued from the radioactive disintegration of thorium-228, and lead-212 which is issued from the radioactive disintegration of radium-224; and nitric acid, preferably at a rate of 1 mol/L to 2 mol/L and, even better, of 2 mol/L to obtain, in view of the above, an optimal retention of lead-212 on the stationary phase 20.

The aqueous solution A1 is circulated in the column 10 at a flow rate which is preferably between 0.5 BV/min and 2 BVs/min.

For a BV of 0.104 mL to 1.25 mL, the volume of aqueous solution A1 used is advantageously between 80 mL and 400 mL whereas the activity of thorium-228 in this solution is between 2 mCi and 11 mCi.

*Step 2:

As stated above, this step consists of subjecting the stationary phase 20 to two successive washings which each have the function of:

removing from the column 10 and notably from the interstitial volume of the stationary phase 20 the radioisotopes other than lead-212 and, in particular, thorium-228 and radium-224, capable of having been retained in the column 10 in step 1 above, and preparing the stationary phase 20 for being contacted with the aqueous ammonium salt solution which is used in step 3 hereinafter for eluting lead-212 and, thus, facilitating this elution.

For this reason, the aqueous solutions A2 and A2' used for these washings are two nitric acid solutions but the aqueous solution A2, which is used for the first washing, has a lower acidity than that of the aqueous solution A1 used to fix lead-212 on the stationary phase in step 1 above, whereas the aqueous solution A2', which is used for the second washing, has, in turn, a lower acidity than that of the aqueous solution A2.

The acidities of the aqueous solutions A2 and A2' must however be selected so as to avoid an elution of lead-212 at this stage of the method.

Thus:

the aqueous solution A2 comprises preferably at least 0.5 mol/L but less than 1 mol/L of nitric acid and, even better, 0.5 mol/L of nitric acid, whereas the aqueous solution A2' comprises preferably at least 0.01 mol/L but less than 0.5 mol/L of nitric acid and, even better, 0.1 mol/L of nitric acid.

The number of BVs used is, for example, 20 BVs for the aqueous solution A2 and 10 BVs for the aqueous solution A2'.

As regards the circulation rates of the aqueous solutions A2 and A2' in the column 10, it is, for example, 1.6 BV/min for both solutions.

*Step 3:

The elution of the lead-212 from the stationary phase 20 is carried out by circulating in the column 10 several BVs of the aqueous ammonium acetate solution A3, in the opposite direction of that wherein the loading of step 1 above and the washings of step 2 above were carried out.

The pH of the aqueous solution A3 is at least equal to 5 for the acetate ions to be able to exert their complexing power with respect to lead-212 but it is preferably at most equal to 7 to avoid having to use, in step 4 hereinafter, an excessively large number of BVs of aqueous solution A7 to acidify the eluate.

Ideally, 25 BVs of an aqueous solution A3 comprising 0.4 mol/L of ammonium acetate of pH equal to 6.5 which is circulated in the column 10 at a rate of 1.6 BV/min is used.

*Step 4:

The washing of the stationary phase 20 provided in this step serves not only to wash the column 10 but also to acidify the eluate, or aqueous solution A4, collected in the preceding step with a view to carrying out step 5 hereinafter.

Thus, this washing is performed by circulating in the column 10, also in the opposite direction of that wherein the loading of step 1 above and the washings of step 2 above were carried out, several BVs of the aqueous nitric acid solution A7 and by collecting the solution issued from this washing in the receptacle 30 wherein the eluate was collected in step 3 above. This collection is advantageously carried out under stirring such that the solution from the washing is mixed with the eluate as it comes out of the column 10.

The number of BVs of aqueous solution A7 used for this washing and the nitric acid concentration of this solution are advantageously selected so as to obtain an eluate/washing solution mixture, or acidified aqueous solution A4, wherein the nitric acid concentration will make it possible to optimally fix the lead-212 contained in this mixture on the stationary phase 50 used in step 5 hereinafter or, in other words, an acidified aqueous solution A4 comprising from 1 mol/L to 2 mol/L of nitric acid.

Typically, from 10 BVs to 20 BVs of an aqueous solution A7 comprising from 2 mol/L to 4 mol/L of nitric acid are used.

Thus, for example, for an eluate obtained with 25 BVs of an aqueous solution A3 comprising 0.4 mol/L of ammonium acetate, 15 BVs of an aqueous solution A7 comprising 3 mol/L of nitric acid were found to be perfectly suitable.

The circulation rate of the aqueous solution A7 in the column 10 is, for example, 1.6 BV/min.

If required, before proceeding to the next step, the nitric acid concentration of the acidified solution A4 can be adjusted by adding nitric acid if it is sought to adjust this concentration upwards or by adding ultrapure water (resistivity: 18.2 MS/cm at 25° C.) if it is sought to adjust it downwards.

*Step 5:

The lead-212 present in the acidified aqueous solution A4 does not yet meet the radiological purity criterion required for medical use.

Thus, step 5 consists of loading once again a chromatography column filled with Pb Resin™ particles with this solution with a view to purifying the lead-212 further, particularly with respect to the traces of thorium-228 and radium-224 still present in the acidified aqueous solution A4.

The chromatography column 40, which is used for this purpose, can be a column fully identical to the column 10, with the same bed volume and the same mass quantity of Pb Resin™ particles.

However, as seen in FIG. 2, it is preferred to use a column 40 with notably smaller dimensions than those of the column 10 with a view to accompanying the purification of lead-212 with a concentration of this lead.

Thus, it is particularly possible to use a column 40 whose the BV and the mass of Pb Resin™ particles are from 4 to 7 times smaller than those of the column 10.

The loading of the stationary phase 50 with the acidified aqueous solution A4 is carried out by circulating this solution in the column 40 at a flow rate which is preferably between 0.5 BV/min and 2 BVs/min.

*Step 6:

The two washings provided in this step have the same functions as those provided in step 2 above, namely:

removing from the column 40 and notably from the interstitial volume of the stationary phase 50 the traces of radioisotopes other than lead-212 and, in particular, of thorium-228 and of radium-224, capable of having been retained in the column 40 in step 5 above, and preparing the stationary phase 50 for being contacted with the aqueous ammonium acetate solution A6 which is used in step 7 hereinafter for eluting lead-212 and, thus, facilitating this elution.

For this reason, they are preferably carried out with aqueous nitric acid solutions A5 and A5', respectively of the same concentration as the aqueous solutions A2 and A2' used in step 2 above and under similar conditions to those described for this step 2.

*Step 7:

Like the elution of the lead-212 of the stationary phase 20, the elution of the lead-212 from the stationary phase 50 is carried out by circulating in the column 40 several BVs of an aqueous ammonium acetate solution A6, of pH at least equal to 5 and, even better, between 5 and 7 such as a solution comprising 0.4 mol/L of ammonium acetate (pH=6.5) which is circulated in the column 40 at a flow rate, for example of 2 BVs/min.

The eluate fractions collected during this elution are preferably kept according to the medical application for which the lead-212 is intended.

Thus, it is possible to only keep the eluate fractions richest in lead-212 to obtain an aqueous solution concentrated in lead-212 as it is possible to keep all of the eluate fractions but at the cost of a dilution of the lead-212.

The method according to the invention was implemented according to the embodiment described above using:

step 1: a column 10 of BV equal to 0.63 mL, containing 255 mg of Pb Resin™ particles and wherein 275 BVs of an aqueous solution A1 comprising 6.1 mCi of thorium-228 and 2 mol/L of nitric acid were circulated, at a flow rate of 1 mL/min;

step 2: 20 BVs of an aqueous solution A2 comprising 0.5 mol/L of nitric acid, at a flow rate of 1 mL/min, then 10 BVs of an aqueous solution A2' comprising 0.1 mol/L of nitric acid, at a flow rate of 1 mL/min;

step 3: 25 BVs of an aqueous solution A3 of pH equal to 6.5 and comprising 0.4 mol/L of ammonium acetate, at a flow rate of 1 mL/min;

step 4: 15 BVs of an aqueous solution A7 comprising 3 mol/L of nitric acid, at a flow rate of 1 mL/min;

step 5: a column 40 of BV equal to 0.104 mL, containing 52 mg of Pb Resin™ particles and wherein the acidified aqueous solution A4 obtained at the end of step 4—which is equivalent to 220 BVs of aqueous solution for the column 40 considering the BV of this column—was circulated at a flow rate of 0.2 mL/min;

step 6: 20 BVs of an aqueous solution A5 comprising 0.5 mol/L of nitric acid, at a flow rate of 1 mL/min, then 10 BVs of an aqueous solution A5' comprising 0.1 mol/L of nitric acid, at a flow rate of 0.2 mL/min;

step 7: 40 BVs of an aqueous solution A6 of pH equal to 6.5 and comprising 0.4 mol/L of ammonium acetate, at a flow rate of 0.2 mL/min.

An aqueous solution was thus obtained comprising lead-212 having a radiological purity at least equal to 99.99% with respect to thorium-228 and at least equal to 99.95% with respect to radium-224, i.e. a radiological purity which is equivalent to that obtained in references [1] and [2].

This radiological purity was determined by measuring the activities of lead-212, thorium-228 and radium-224 by γ spectrometry and by applying the formulas:

Purity of lead-212 with respect to thorium-228=
[$^{212}$Pb activity/($^{212}$Pb activity+$^{228}$Th activity)]×100;

Purity of lead-212 with respect to radium-224=
[$^{212}$Pb activity/($^{212}$Pb activity+$^{224}$Ra activity)]×100.

REFERENCES CITED

[1] WO-A-2013/174949
[2] WO-A-2017/093069

What is claimed is:

1. A method for producing lead-212 from an acidic aqueous solution A1 comprising thorium-228 and daughters thereof, which comprises the following successive steps:
   a purification of the lead-212 present in the aqueous solution A1, which purification comprises the following steps:
   a) providing a first chromatography column comprising a first stationary phase which selectively retains lead with respect to thorium and radium when thorium-228 and the daughters thereof are in an acidic aqueous solution having a pH between a first pH value, $pH_1$, and a second pH value, $pH_2$, greater than $pH_1$;
   b) loading the first chromatography column with the aqueous solution A1, the aqueous solution A1 having a pH between $pH_1$ and $pH_2$;
   c) doing at least one washing of the first stationary phase with an acidic aqueous solution A2 having a pH between $pH_1$ and $pH_2$ but greater than the pH of the aqueous solution A1, and a second washing of the first stationary phase with an aqueous solution A2' having a pH between $pH_1$ and $pH_2$ but greater than the pH of the aqueous solution A2;
   d) eluting the lead-212 from the first stationary phase with an aqueous solution A3 having a pH greater than $pH_2$, whereby an aqueous solution A4 comprising lead-212 is obtained; then
   a purification of the lead-212 present in the aqueous solution A4, which purification comprises the following steps:
   e) loading a second chromatography column with the aqueous solution A4, the second chromatography column comprising a second stationary phase which selectively retains lead with respect to thorium and radium when thorium-228 and the daughters thereof are in an acidic aqueous solution having a pH between a first pH value, $pH_3$, and a second pH value, $pH_4$, greater than $pH_3$;
   f) at least one washing of the second stationary phase with an acidic aqueous solution A5 having a pH between $pH_3$ and $pH_4$; and
   g) eluting the lead-212 from the second stationary phase with an aqueous solution A6 having a pH greater than $pH_4$, and wherein purified lead-212 is produced form the aqueous solution A1 comprising thorium-228 and daughters thereof.

2. The method of claim 1, wherein the aqueous solutions A3 and A6 are aqueous solutions comprising an agent complexing lead.

3. The method of claim 1, wherein the first chromatography column has a first and a second end opposite one another, the aqueous solutions A1 and A2 are circulated in the first chromatography column from the first end to the second end and the aqueous solution A3 is circulated in the first chromatography column from the second end to the first end.

4. The method of claim 1, which further comprises, between step d) and step e), an acidification of the aqueous solution A4 to bring the pH of the aqueous solution A4 to a value between $pH_3$ and $pH_4$.

5. The method of claim 4, wherein the acidification of the aqueous solution A4 comprises at least one washing of the first stationary phase with an acidic aqueous solution A7 and an addition of all or part of the aqueous solution issued from the washing to the aqueous solution A4.

6. The method of claim 1, wherein the aqueous solution A5 has a pH greater than the pH of the aqueous solution A4.

7. The method of claim 1, wherein step f) comprises a first washing of the second stationary phase with the aqueous solution A5 and a second washing of the second stationary phase with an aqueous solution A5' having a pH between $pH_3$ and $pH_4$ but greater than the pH of the aqueous solution A5.

8. The method of claim 1, wherein the second chromatography column has a first and a second end opposite one another, the aqueous solutions A4 and A5 are circulated in the second chromatography column from the first end to the second end and the aqueous solution A6 is circulated in the second chromatography column from the second end to the first end.

9. The method of claim 1, wherein the first and/or second stationary phases are made of a material which comprises a solid support impregnated with a solution comprising a crown-ether in an organic diluent non-miscible with water, preferably an alcohol having 8 carbon atoms or more.

10. The method of claim 9, wherein the crown-ether is a dicyclohexano-18-crown-6 or a dibenzo-18-crown-6 wherein the cyclohexyl or benzyl groups are substituted by one or more straight-chain or branched $C_1$ to $C_{12}$ alkyl groups.

11. The method of claim 10, wherein the crown-ether is 4,4' (5')-di-tert-butylcyclohexano-18-crown-6 and the organic diluent is isodecanol.

12. The method of claim 1, wherein the aqueous solutions A1 and A4 comprise from 1 mol/L to 2 mol/L of nitric acid.

13. The method of claim 1, wherein the aqueous solution A2 comprises at least 0.01 mol/L of nitric acid and less than 1 mol/L of nitric acid.

14. The method of claim 13, wherein the aqueous solution A2 comprises at least 0.5 mol/L of nitric acid and less than 1 mol/L of nitric acid and step c) comprises a first washing of the first stationary phase with the aqueous solution A2 and a second washing of the first stationary phase with an aqueous solution A2' comprising at least 0.1 mol/L of nitric acid and less than 0.5 mol/L of nitric acid.

15. The method of claim 1, wherein the aqueous solution A5 comprises at least 0.1 mol/L of nitric acid and less than 1 mol/L of nitric acid.

16. The method of claim 15, wherein the aqueous solution A5 comprises at least 0.5 mol/L of nitric acid and less than 1 mol/L of nitric acid and step f) comprises a first washing of the second stationary phase with the aqueous solution A5 and a second washing of the second stationary phase with an aqueous solution A5' comprising at least 0.01 mol/L of nitric acid and less than 0.5 mol/L of nitric acid.

17. The method of claim 1, wherein the solutions A3 and A6 are aqueous solutions of a citrate, an oxalate or an acetate of ammonium or sodium having a pH at least equal to 5 and at most equal to 9.

18. The method of claim 1, wherein thorium-228 and the daughters thereof are at radioactive equilibrium in the aqueous solution A1.

19. The method of claim 1, which further comprises, before step a), a step of removing the lead-208 present in the aqueous solution A1, which step comprises a circulation of the aqueous solution A1 in a chromatography column comprising a stationary phase which selectively retains lead when thorium-228 and the daughters thereof are in an acidic aqueous phase, and a collection of the aqueous solution A1 having circulated in the chromatography column.

* * * * *